Nov. 17, 1964

H. F. RIETH 3,157,152

TRANSDUCING SYSTEM

Filed Sept. 4, 1962

INVENTORS
Harold F. Rieth
By Smyth, Roston & Pavitt
Attorneys

United States Patent Office 3,157,152

Patented Nov. 17, 1964

3,157,152
TRANSDUCING SYSTEM

Harold F. Rieth, Pasadena, Calif., assignor to Packard-Bell Electronics Corporation, Los Angeles, Calif., a corporation of California Filed Sept. 4, 1962, Ser. No. 221,144
7 Claims. (Cl. 116—137)

The present invention relates to a new and improved transmitter and, more particularly, to a transmitter that is particularly adapted to radiating sonic signals suitable for actuating a remote control system.

Under some circumstances it is desirable to be capable of remotely controlling an apparatus. For example, when a viewer is watching a television receiving set, he is normally located too far from the receiver to be able to reach the receiver. As a result, adjustment of the receiver is very inconvenient. In order to enable a viewer to remotely adjust some of the controls on a television receiver from a distant viewing location, it has been proposed to provide a remote control receiver in the television set which will be capable of adjusting the television set in response to sonic signals. The viewer may then utilize a sonic transmitter capable of transmitting one or more suitable sonic signals to the remote control receiver. This will be effective to cause the receiver to make the desired adjustments of the television set.

The sonic transmitter in one form of remote control system employs a plurality of tuning rods that may be struck by a hammer or similar device so as to cause the tuning rods to mechanically vibrate at the required frequencies and radiate beams of sonic signals. Although such devices have been effective to provide the desired controls, when there are a large number of functions to be controlled, it is necessary to employ a corresponding number of tuning rods. This, in turn, has resulted in transmitters which have been bulky and difficult to handle and use. However, to be commercially attractive such transmitters must not only be small, compact and lightweight, but they must also be simple and convenient to use. As a result, the use of sonic transmitters employing mechanically vibrating tuning rods has been limited to those installations wherein only a small number of functions such as selection of the station and the volume of the sound are to be remotely controlled. Where it is desirable to control a greater number of functions, for example, switching the television receiver from one band to another band such as the VHF, the use of mechanical transmitters heretofore has been limited because of the prohibitively bulky and difficult transmitters that have been required.

It is now proposed to provide a sonic transmitter of the mechanical variety which will overcome the foregoing difficulties. More particularly, it is proposed to provide a sonic transmitter capable of transmitting a large number of signals which is light-weight, compact and simple to operate. This is to be accomplished by providing a transmitter wherein a plurality of tuning rods are provided which have natural resonant frequencies equal to the frequencies which will actuate the remote control receiver to produce the desired functions. These tuning rods are disposed parallel to each other in a very compact array and a striker assembly is provided which may be moved relative to the various tuning rods. Thus, the operator may adjust the transmitter so that the striker assembly may strike and excite any particular rod that is desired to be employed. As a result, even though there may be a large number of tuning rods, they can be arranged in a compact array so that the transmitter will be small and easy to use.

These and other features and advantages of the present invention will become readily apparent from the following detailed description of one embodiment thereof, particularly when taken in connection with the accompanying drawings wherein like reference numerals refer to like parts, and wherein.

Figures 1, 2, 3:
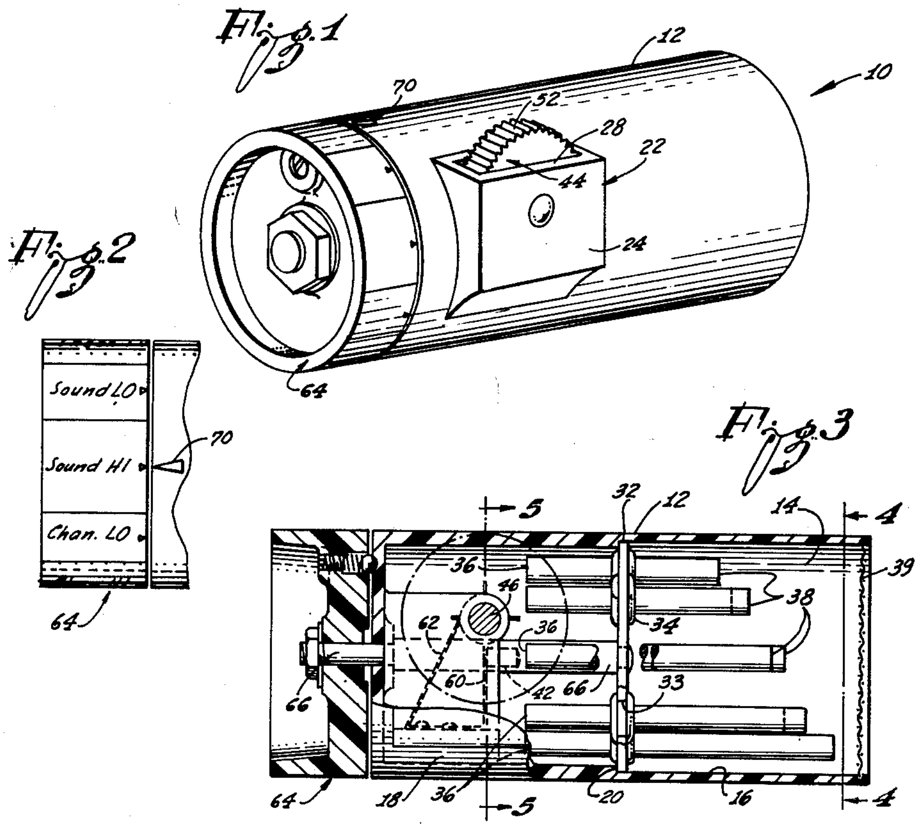
FIGURE 1 is a perspective view of a sonic transmitter embodying one form of the present invention.
FIGURE 2 is a fragmentary side view of one end of the transmitter of FIGURE 1.
FIGURE 3 is a longitudinal cross-sectional view of the transmitter of FIGURE 1.
Figure 4:
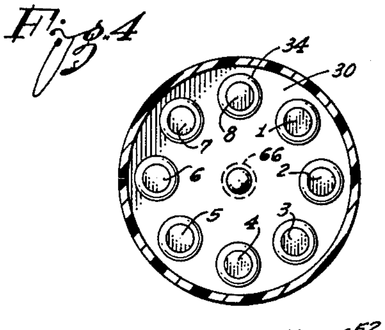
FIGURE 4 is a transverse cross-sectional view taken substantially along the plane of line 4—4 of FIGURE 3.
Figure 5:
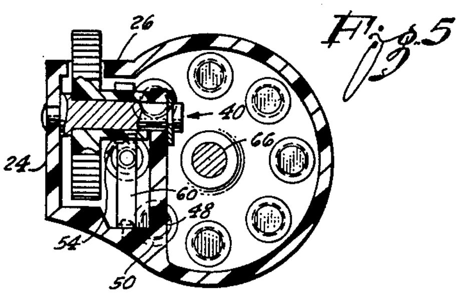
FIGURE 5 is a transverse cross-sectional view taken substantially along the plane of line 5—5 of FIGURE 3.
Figure 6:
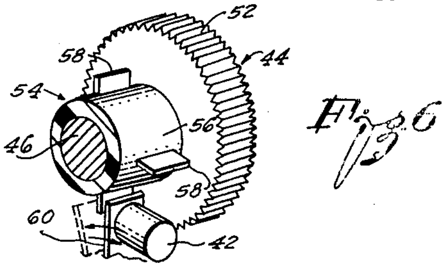
FIGURE 6 is a perspective view of the control portion of the transmitter.

Referring to the drawings in more detail, the present invention is particularly adapted to be embodied in a sonic signal or transmitter 10 for radiating or transmitting a beam of sonic energy suitable for use in a remote control system. More particularly, the transmitter 10 is adapted for actuating a remote control receiver in a television receiver set. The remote control receiver will be effective to perform various functions such as adjusting the volume, changing the channel, switching the television set from one band to another band, or controlling various other functions such as the contrast, colors, etc.

The transmitter 10 comprises a housing 12 which may be fabricated in any desired manner such as by molding a single plastic unit. In the present instance, the housing 12 has a substantially cylindrical exterior that is preferably of a size which is convenient to hold in one hand. For example, it may be on the order of about 2 inches in diameter and about 4 inches long.

The housing 12 includes a passage 14 that extends axially thereof. This passage 14 preferably is substantially cylindrical with a portion 16 of large diameter and a portion 18 of small diameter. The portions 16 and 18 may be separated from each other by an annular shoulder 20.

An enlargement 22 may be provided on the side of the housing adjacent one end thereof. This enlargement 22 may include a side wall 24 and a top wall 26 which are positioned to form a pocket that opens into the passage. In addition, an opening 28 may be provided in the top wall 26 so as to provide access between the pocket and the atmosphere.

In order to create the sonic signals, a plurality of tuning rods 1, 2, 3, 4, 5, 6, 7 and 8 or similar devices may be provided inside of the housing 12 for mechanical vibration. Although any desired number of tuning rods may be employed, in the present instance, for purposes of illustration, there are eight rods. These tuning rods 1 and 8, inclusive, are dimensioned to have a single primary resonant frequency. The frequency of each rod is substantially identical to one of the frequencies required to actuate a remote control receiver to produce a particular control. More particularly, one tuning rod may have a frequency that will be effective to produce an increase in the volume of the sound from the television set while another rod will have a frequency that will be effective to produce a decrease in volume. Similarly, another pair of tuning rods may be tuned to the frequencies for producing increases and decreases in the station frequency or increases and decreases in contrast or colors, etc., or for switching the receiver from one frequency band such as UHF to another band such as VHF.

The tuning rods 1 to 8, inclusive, are arranged inside of the barrel in a compact configuration. In the present instance, the tuning rods are disposed in a substantially cylindrical array with all of the tuning rods 1 to 8, inclusive, being parallel to each other and to the axis of the barrel. In order to secure the tuning rods 1 to 8, inclusive, in the foregoing configuration, a disk 30 may be provided that fits inside of the housing 12.

The periphery 32 of the disk 30 is preferably a snug but sliding fit against the large portion 16 on the inside of the housing 12. In addition, the disk 30 may engage the annular shoulder 20. Thus, the disk 30 will be retained centered in the housing 12 substantially normal to the axis thereof. The present disk 30 includes a plurality of apertures 33 that are spaced around the disk 30 at substantially equally spaced intervals. Each of the tuning rods 1 to 8, inclusive, are secured in one of these apertures 33 by means of rubber grommets 34. The inner ends 36 of the rods 1 to 8, inclusive, are all disposed in a common plane substantially normal to the axis of the housing 12. The outer ends 38 of the rods 1 to 8, inclusive, extend toward the end of the housing 12, but due to their assorted lengths, they will terminate at various locations therein. A mesh or screen 39 may be secured across the end of the housing 12 so as to conceal the contents thereof but will permit sonic signals to pass through.

In order to actuate or excite the tuning rods 1 to 8, inclusive, into vibrating, a striker assembly 40 may be provided inside of the housing 12 adjacent the inner ends 36 of the rods 1 to 8, inclusive. In the present instance, this striker assembly 40 includes a hammer 42 and a rotatable wheel 44 for causing the hammer 42 to percussively strike the ends 36 of the tuning rods 1 to 8, inclusive. The wheel 44 is preferably a single plastic member molded around a steel shaft 46 extending axially therethrough. One end of this steel shaft 46 is rotatably disposed in a journal formed in the side wall 24 of the enlargement 22. The opposite end of the shaft 46 is disposed in a journal formed in the upper end of a bracket 48 secured to the side of a shoulder 50 in the passage 14. The periphery 52 of the wheel 44 is preferably serrated so that a person holding the transmitter 10 can easily rotate the wheel 44 by forcing his thumb or finger against the periphery. The wheel 44 may also include a cog wheel 54 on the side thereof adjacent to the bracket 48. This cog wheel 54 includes a center hub 56 having a substantially cylindrical exterior and a series of teeth 58 that are spaced circumferentially around the hub 56. In the present instance, there are four of these teeth 58 spaced at approximately 90° intervals.

The present hammer 42 comprises a small metal cylinder that is secured to the upper end of a resilient leaf spring 60. This spring 60 consists of a strip of resilient material such as spring steel and it includes a foot that is bent at a right angle to the main portion of the spring and is secured to the shoulder 50 by any suitable means such as riveting. The upper end of the spring 60 is disposed immediately adjacent to the hub 56 in a position to engage the teeth 58 as they rotate therepast. The metal cylinder or hammer 42 is positioned in substantial alignment with and immediately adjacent to the inner end of one of the tuning rods. As a result, when the spring 60 is deflected, the hammer 42 may swing into engagement with the end of the tuning rod aligned therewith.

In addition, a detent spring 62 may also be secured to the shoulder 50 so as to project upwardly and terminate immediately adjacent to the hub 56. Normally, this spring 62 will be effective to engage the base of one of the teeth 58 and thereby prevent the cog wheel 54 from rotating in a reverse direction. However, when the cog wheel 54 rotates in a forward direction, the detent spring 62 will pass over the end of the teeth 58 and will not interfere with the rotation of the wheel.

To permit the operator to select which of the tuning rods 1 to 8, inclusive, will be excited by the striker assembly 40, a selector knob 64 may be secured to the end of the housing 12. The exterior of this knob 64 preferably forms a continuation of the housing 12. That is, the knob 64 may have the same external diameter as the housing 12. The knob 64 is preferably of sufficient length to make it convenient to grasp for rotating it.

The selector knob 64 is preferably connected to the disk 30 so that turning the knob 64 will turn the disk 30 and cause the array of tuning rods 1 to 8, inclusive, to rotate therewith. In the present instance, this is accomplished by means of a shaft 66 that extends axially of the housing 12 and has one end secured to the disk 30 so that they will rotate together. The opposite end of the shaft 66 may be secured to the inside of the knob 64 so as to be locked thereon. In addition to causing the disk 30 and knob 64 to rotate together, the shaft 66 will also retain the disk 30 and knob 64 axially spaced. As a result, the disk 30 will be held against the annular shoulder 20 and the knob 64 will be retained against the end of the housing 12. It may thus be seen that if the operator rotates the knob 64 relative to the housing 12, the array of tuning rods 1 to 8, inclusive, will rotate inside of the housing 12 whereby any preselected tuning rod 1 to 8, inclusive, may be positioned in substantial alignment with the striker assembly 40.

The exterior of the selector knob 64 may have a plurality of legends thereon. These legends correspond in number to the number of tuning rods 1 to 8, inclusive, and are positioned circumferentially there-around so as to correspond to the spacing of the rods. Each of these legends may designate one of the functions which are to be controlled. A pointer 70 may be disposed on the outside of the barrel so as to register with the legend which corresponds to the tuning rod 1 to 8, inclusive, aligned with the striker assembly 40. If desired, a suitable detent means may be provided for insuring that the selector knob will be retained only in positions where the hammer 42 will be aligned with one of the tuning rods 1 to 8, inclusive.

It may thus be seen that in order to utilize the present sonic signal or transmitter 10, the operator may grasp the housing 12 in one hand and turn the selector knob 64 until the pointer 70 registers with the legend on the knob 64 corresponding to the function the operator desires to have performed. When the selector knob 64 is rotated in this manner, the disk 30 will rotate therewith inside of the housing 12. This, in turn, will cause the tuning rods 1 to 8, inclusive, to move inside of the housing whereby they will successively move past the striker assembly 40. When the pointer 70 is aligned with the correct legend, the corresponding tuning rod will be aligned with the striker assembly 40. This rod will have a natural resonant frequency equal to the frequency which will activate the remote control receiver in the television set or whatever equipment is being controlled.

The operator may then aim the end having the screen 39 therein at the television set or controlled equipment. The wheel 44 is then rotated by pushing a thumb or finger against the serrated periphery of the wheel. Each time the wheel is rotated approximately 90°, the end of the spring 60 will be deflected by one of the teeth 58 until the end of the spring passes over the end of the tooth. When this occurs, the spring 60 will be released and the hammer 42 will fly forward against the end of the tuning rod in alignment with it. This will then cause the rod to vibrate and radiate a sonic signal through the screen 39. The operator may then repeat the operation as many times as required to produce the required adjustment. In the event a different adjustment is desired, the operator can then merely re-adjust the selector knob 64 to position the legend adjacent the pointer.

Although the present invention has been disclosed and described with reference to a particular embodiment, it will be readily apparent to persons skilled in the art that numerous changes and modifications may be made thereto without departing from the spirit of the invention. Accordingly, the foregoing disclosure and description are for illustrative purposes only and do not limit the invention which is defined only to the claims which follow.

What is claimed is:

1. A transmitter for generating signals of a plurality of different frequencies comprising the combination of:

an elongated housing for being hand held, said housing having a passage extending axially therethrough.

a cylindrical array of resonant members disposed in said passage, each of said members being adapted to resonate at its own frequency to radiate signals of that frequency, a striker assembly having a leaf spring secured to said housing in a predetermined fixed relation to the housing, said leaf spring being positioned adjacent said array of said resonant members and including a hammer positioned on said spring to strike and excite a preselected one of the members into vibrating at its resonant frequency, a control wheel rotatably mounted on said housing with a portion of the wheel projecting from said housing to provide an exposed control surface, said wheel being disposed parallel to the resonant members in the array and being positioned to be actuated by a finger of a hand holding the housing so as to be rotated by the finger, means for moving said cylindrical array of members inside of said housing relative to said striker assembly to thereby vary the preselected member, and means interconnecting said control wheel with said leaf spring to deflect the leaf spring and release it whenever said control wheel is rotated through a predetermined distance.

2. A transmitter for generating signals of a plurality of different frequencies comprising the combination of:

a rigid elongated housing with a subsbtantially cylindrical exterior surface of a size for being hand held, said housing having a passage extending axially therethrough, a cylindrical array of resonant members disposed in said passage, each of said members being adapted to vibrate and radiate signals of different frequencies, a striker assembly having a leaf spring secured to said housing in said passage adjacent said array, a hammer carried by said spring and positioned to strike a preselected one of said members and cause it to vibrate at its resonant frequency, a control member rotatably mounted on said housing in said passage means operatively interconnected with said control member and said leaf spring to deflect and release said spring when the control member is rotated, said control member including a portion thereof that extends from the exterior of said housing to be actuated by a finger of a hand holding said housing, said control member when rotated by said finger being effective to deflect and release the leaf spring whereby the hammer will strike the preselected resonant member, and means for moving said array of resonant members relative to said striker assembly to change the preselected resonant member.

3. A transmitter for generating signals of a plurality of different frequencies comprising the combination of:

a housing for being hand held, a cylindrical array of tuning rods disposed inside of said housing substantially concentrically about an axis of said housing, each of said tuning rods being effective to resonate at a preselected frequency that is different from the frequencies of the other of said tuning rods, a leaf spring disposed in said housing and having one end thereof secured to said housing whereby the other end of said spring will be disposed adjacent one of the tuning rods in said array of tuning rods, a hammer member secured to the free end of said spring for percussively striking a preselected one of the tuning rods aligned therewith to cause the struck tuning rod to vibrate at its resonant frequency, a wheel member rotatably mounted upon said housing and having the periphery thereof extending from said housing for being manipulated by one of the fingers of a hand holding the housing, means interconnecting said wheel with said leaf spring for deflecting and releasing said spring when said wheel is rotated whereby said hammer will strike said preselected tuning rod, and means carried by said housing and interconnected with said array for rotating said array relative to the leaf spring.

4. A transmitter for generating signals of a plurality of different frequencies comprising the combination of:

a housing for being hand held, a cylindrical array of tuning rods disposed inside of said housing substantially concentric about an axis, each of said tuning rods being effective to resonate at a preselected frequency that is different from the frequencies of the other of said tuning rods, a leaf spring having one end rigidly secured to said housing to form a cantilever spring, the free end of the spring being positioned adjacent said array of tuning rods, a hammer carried by the free end of said spring for percussively striking a preselected one of said tuning rods aligned therewith to cause the tuning rod to vibrate at its resonant frequency, first manually actuatable means exposed from said housing for rotating said array about said axis and relative to said leaf spring to position any preselected one of said tuning rods in alignment with said hammer, and second manually actuatable means including a control wheel rotatably mounted on the housing for rotating about the axis of the wheel, said wheel having a control surface exposed from said housing and positioned to be actuated by a finger of a hand holding a one way drive interconnecting the control wheel with the leaf spring, said one way drive being effective when the wheel is rotated by said finger on said control surface to deflect and release the free end of said spring to cause said hammer to strike said preselected tuning rod.

5. A transmitter for generating signals of a plurality of different frequencies comprising the combination of:

a housing member, a support disposed inside of said housing member for rotating about an axis extending through said housing member, a cylindrical array of resonant tuning rods mounted on said support inside of said housing member, said tuning rods being carried by said support and movable therewith, each of said tuning rods having a natural resonant frequency and being free to vibrate and radiate signals of sonic energy, a striker assembly disposed in said housing member adjacent said array of resonant tuning rods, said assembly including a leaf spring and a hammer positioned to strike one of said tuning rods and cause it to vibrate at its resonant frequency, a selector member secured to said housing member, an exposed surface on one of said members disposed adjacent the other of said members, a separate indicia on said surface for each of the various resonant members, means interconnecting said selector member with said support whereby moving said selector member to place a particular indicia in a preselected position will position the corresponding tuning rod in alignment with said hammer, and manually actuatable control wheel rotatably mounted on the housing member and having a portion thereof exposed from said housing member, said control wheel being disposed in a plane parallel to the tuning rods, means interconnecting the control wheel with the leaf spring to deflect the leaf spring and release it and the hammer to strike the tuning rod positioned in alignment with said striker assembly by said selector member when said wheel is rotated.

6. A transmitter for generating signals of a plurality of different frequencies comprising the combination of:

a cylindrical housing having a passage extending axially therethrough, a mounting disc disposed inside of said cylindrical housing at substantially right angles to the axis of the housing for rotating about said axis, a cylindrical array of tuning rods mounted on said disc substantially concentrically about said axis, each of said tuning rods being effective to resonate at a preselected frequency that is different from the frequencies of the other of said tuning rods, a leaf spring disposed in said housing and carrying a hammer positioned to strike a preselected one of said tuning rods, a cylindrical selector rotatably disposed on one end of said housing and having an exposed surface with a plurality of indicia thereon, said selector being connected to said disc for rotating said array of tuning rods about said axis and past said striker assembly whereby the preselected tuning rod aligned with said striker assembly will correspond to the indicia in a particular position; a control wheel rotatably mounted inside of the housing at substantially right angles to the selector and having a control portion that projects from the housing, and means interconnecting said control wheel with the spring to deflect and release the spring when said control wheel is rotated whereby the hammer will strike the preselected tuning rod.

7. A transmitter for generating signals of a plurality of different frequencies comprising the combination of:

a cylindrical housing member having a cylindrical passage extending axially therethrough, a mounting disc disposed inside of said cylindrical housing member at substantially right angles to the axis of the housing for rotating about said axis, a cylindrical array of tuning rods mounted on said disc substantially concentrically about said axis, each of said tuning rods being effective to resonate at a preselected frequency that is different from the frequencies of the other of said tuning rods, a leaf spring disposed in said housing member and carrying a hammer positioned to strike a preselected one of said tuning rods, a control wheel rotatably mounted on said housing and having a small control portion that projects from the housing for being manipulated to rotate the wheel, means interconnecting the wheel with the spring to deflect it and release it whereby the hammer will strike a tuning rod when said wheel is rotated, a cylindrical selector member secured to one end of said housing member substantially normal to said wheel and coaxial with said axis for rotating relative to said housing member, mean connecting said selector member to said disc for rotating said array of tuning rods about said axis and past said striker assembly whenever said selector member rotates relative to said housing member, detent means on at least one of said members to retain said array of tuning rods positioned so that each of said tuning rods may be individually positioned adjacent said striker assembly, an indicator on one of said members, and a cylindrical array of indicia on the other of said members corresponding to the respective one of said tuning rods, said indicia being positioned to register with said indicator when the detent means retains the respective tuning rod aligned with the striker assembly.

References Cited in the file of this patent

UNITED STATES PATENTS

| | | |
|---|---|---|
| 2,868,156 | DeCola et al. | June 13, 1959 |
| 3,077,856 | Rieth | Feb. 19, 1963 |